United States Patent [19]

Tsunabuchi et al.

[11] Patent Number: 5,242,096

[45] Date of Patent: Sep. 7, 1993

[54] AUTOMATIC REFLOW SOLDERING APPARATUS

[75] Inventors: Masashi Tsunabuchi; Taihei Takeshita; Tadanori Ishikura; Akifumi Takashima, all of Tokyo, Japan

[73] Assignees: NEC Corporation; EIGHTECH TECTRON Co., Ltd., Tokyo, Japan

[21] Appl. No.: 921,751

[22] Filed: Jul. 30, 1992

[51] Int. Cl.[5] ............................................. B23K 1/008
[52] U.S. Cl. ......................................... 228/9; 228/43; 228/212; 228/214
[58] Field of Search ............... 228/102, 180.1, 180.2, 228/214, 219, 8, 9, 33, 42, 43, 212; 219/79, 85.17

[56] References Cited

U.S. PATENT DOCUMENTS

| | | | |
|---|---|---|---|
| 4,068,792 | 1/1978 | Dixon | 228/39 |
| 4,076,165 | 2/1978 | Latasiewicz | 228/180.1 |
| 4,390,120 | 6/1983 | Broyer | 228/180.1 |
| 4,637,541 | 1/1987 | Tanny | 228/180.1 |
| 4,654,502 | 3/1987 | Furtek | 228/180.1 |
| 4,913,334 | 4/1990 | Kondo | 228/47 |

*Primary Examiner*—Samuel M. Heinrich
*Attorney, Agent, or Firm*—Finnegan, Henderson, Farabow, Garrett & Dunner

[57] ABSTRACT

An automatic reflow soldering apparatus for soldering a printed circuit board having a plurality of electronic elements mounted thereon to be soldered while the printed circuit is heated, wherein transporting means transports a carrier carrying the printed circuit board to be soldered, positioning means arranged on the carrier position the printed circuit board on the carrier and support means arranged on the carrier support the printed circuit board to prevent the latter from being warped when heated to be soldered. The printed circuit board is transported through all of the soldering processes from a heating process to a cooling process while the printed circuit board is thus positioned and supported. Further provided is means which is automatically operated to position and support the printed circuit board on the carrier.

4 Claims, 8 Drawing Sheets

AUTOMATIC REFLOW SOLDERING APPARATUS

FIELD OF THE INVENTION

The invention relates to an automatic reflow soldering apparatus and more particularly relates to such a type of soldering apparatus wherein a carriage for carrying a printed circuit board has a plurality of warp preventing supports provided thereon to support the printed circuit board at the most appropriate positions on the underside thereof where the supports will not interfere with the electronic elements mounted on the printed circuit board to be soldered. The printed circuit board is thus prevented from being warped by high temperatures while the carriage carrying the printed circuit board is transported through all of the soldering processes including a plurality of preheating chambers. Thus the apparatus is designed to prevent the printed circuit board from being warped even to a minimum extent and provides a reliable and high-quality soldering operation especially for large sized printed circuit boards having multipin and/or fine lead pitch electronic elements mounted thereon to be soldered and further provides a remarkable savings of labor.

DESCRIPTION OF THE RELATED ART

It is generally known that reflow soldering apparatus is designed to solder printed circuit boards, each having a plurality of electronic elements mounted at predetermined positions respectively thereon, where pads printed circuit terminals) are coated with a cream solder. Actually the printed circuit boards are transported by a transporting device while the printed circuit boards are progressively heated up by a preheater, and the electronic elements are soldered to the printed circuit boards at a final stage by the cream solder which is heated up in a short time to a soldering temperature.

According to the conventional reflow soldering apparatus, the printed circuit boards are transported by a chain conveyer or the like while the opposite sides of the printed circuit boards are placed on a pair of belts of the chain conveyer. Therefore the central portion of each printed circuit board, which is not supported, tends to bend down due to its own weight and/or due to the weight of the electronic elements mounted on the printed circuit board. This tendency is remarkable especially regarding a large sized and/or thin printed circuit board.

Further the printed circuit board has generally a bending tendency because the board is heated up to a high temperature in a preheating chamber and a reflow soldering chamber. The printed circuit board is further exposed to the air or nitrogen gas filling the reflow soldering apparatus, heated to a high temperature and circulated so as to blow the printed circuit board from above to maintain a constant temperature distribution in the preheating chamber and the reflow soldering chamber. Therefore the tendency of the printed circuit board to bend down is increased and the soldering is made while a strained force is applied to the leads of electronic elements to be soldered to the printed circuit board resulting in the lack of reliable soldering. Further the bent or warped printed circuit board will give rise to a problem when additional electronic elements are soldered to the printed circuit board in the next process or when the printed circuit board is assembled into machinery.

In order to prevent such a warping phenomenon of the printed circuit board, it has been proposed that the soldered printed circuit board be cooled down while the printed circuit board is supported at the underside thereof. This method is however quite ineffective to prevent warpage of the printed circuit board which was caused in preceding heating process, and is unable to attain a sufficiently desired soldering quality. According to such a conventional reflow soldering apparatus, especially a large sized and thin printed circuit board will be remarkably warped when the board is transported through a preheating chamber and a reflow soldering chamber. As a result, the electronic elements mounted on the board are moved and the leads tend to float. The worst situation is where the printed circuit board itself slips off from the transporting device due to the warping phenomena caused during the heating and soldering processes.

OBJECTS OF THE INVENTION

The present invention has been provided to eliminate the defects and disadvantages of the prior art as mentioned above. It is therefore an object of the invention to place the printed circuit board on a plurality of warp preventing supports arranged on a carrier which carries the printed circuit board and is transported through all of the soldering processes, to thereby restrict to a minimum extent the warp of the print circuit board caused by a heating temperature.

It is another object of the invention to provide reliable and high-quality soldering effects to the printed circuit boards and electronic elements of various and different properties without inviting excessive stresses which may otherwise be applied to the electronic elements and the leads thereof so that the additional electronic elements may be soldered to the printed circuit board without any inconveniences in the next process and also the soldered printed circuit board may be efficiently assembled into machinery as desired.

It is another object of the invention to correctly position the printed circuit board with respect to the carrier by inserting positioning guides into positioning openings of the printed circuit board and also to rearrange the warp preventing supports on the carrier by application of magnets in accordance with the sizes and the types of the printed circuit boards to be soldered so that the warp preventing supports may support the printed circuit board in a most desired manner without interfering with the electronic elements mounted on the printed circuit board.

It is another object of the invention to return the carrier into a printed circuit board entering station by a returning conveyer after the printed circuit board has been soldered so that the carrier may carry the next printed circuit board to be soldered.

It is another object of the invention to provide a robot on the carrier returning conveyer. The robot is automatically operated to rearrange the warp preventing support positionally and numerically on the carrier in accordance with the size and type of the printed circuit board to be soldered next while the carrier returning conveyer is returning the carrier to the printed circuit board entering station. The robot will further prevent the misplacement of the warp preventing supports which may otherwise happen.

It is still another object of the invention to discriminate the size and type of the printed circuit board which is entered to be soldered so as to operate the robot with the discriminated information to rearrange the warp preventing supports on the carrier in accordance with the size and type of the printed circuit board so that printed circuit boards of any size and any type may be most appropriately supported on the carrier.

SUMMARY OF THE INVENTION

In short, the present invention relates to an automatic reflow soldering apparatus for soldering a printed circuit board having a plurality of electronic elements mounted thereon to be soldered while the printed circuit board is heated, the apparatus substantially comprising: means for transporting the printed circuit board; carrier means for carrying the printed circuit board thereon and being transported by the transporting means; positioning guide means arranged on the carrier means to position the printed circuit board on the carrier means; support means arranged on the carrier means to support the printed circuit board at the underside thereof to prevent the printed circuit board from being warped during the soldering processes of the printed circuit board; wherein the printed circuit board is positioned on the carrier means by the positioning guide means and is supported by the warp preventing support means.

Another aspect of the invention relates to an automatic reflow soldering apparatus for soldering a printed circuit board having a plurality of electronic elements mounted thereon to be soldered while the printed circuit board is heated, the apparatus substantially comprising: carrier means for carrying the printed circuit board thereon and provided with a plurality of guides for positioning the print circuit board on the carrier means and a plurality of supports for supporting the positioned printed circuit board to prevent the latter from being warped during the soldering processes of the printed circuit boards; a station for receiving the printed circuit board to be soldered; elevating means located in the printed circuit board entering station and elevating the carrier means to enable the latter to carry the printed circuit board entered into the printed circuit board entering station in such a manner that the positioning guides position the print circuit board on the carrier means and the warp preventing supports support the printed circuit board; heating means for heating up the printed circuit board to be soldered; means for transporting the carrier means carrying the printed circuit board through the heating means for soldering the printed circuit board; a second station for taking out the soldered printed circuit board; lowering means located in the printed circuit take-out station and lowering the carrier means to separate the latter from the soldered print circuit board so that only the soldered printed circuit board may be transported away from the printed circuit board take-out station; conveyer means for returning the lowered carrier means to the printed circuit board entering station; wherein the printed circuit board entered into the printed circuit board entering station is soldered while the same is placed on the circulatingly transported carrier means one after another in such a manner that the printed circuit board is positioned on the carrier means by the positioning guides and is supported by the warp preventing supports.

Further another aspect of the invention relates to an automatic reflow soldering apparatus for soldering a printed circuit board having a plurality of electronic elements mounted thereon to be soldered, the apparatus substantially comprising: carrier means for carrying the printed circuit board thereon and provided with a plurality of guides for positioning the printed circuit board on the carrier means and a plurality of supports for supporting the positioned printed circuit board to prevent the latter from being warped during the soldering processes of the printed circuit board; a station for entering the printed circuit board to be soldered; elevating means located in the printed circuit board entering station and elevating the carrier means to enable the latter to carry the printed circuit board entered into the printed circuit board entering station in such a manner that the positioning guides position the printed circuit board on the carrier means and the warp preventing supports support the printed circuit board; heating means for heating up the printed circuit board to be soldered; means for transporting the carrier means carrying the printed circuit board through the heating means for soldering the printed circuit board; a second station for taking out the soldered printed circuit board; lowering means located in the printed circuit board take-out station and lowering the carrier means to separate the latter from the soldered printed circuit board so that only the soldered printed circuit board may be transported away from the printed circuit board take-out station; conveyer means for returning the lowered carrier means to the printed circuit board entering station; robot means located on the carrier returning conveyer means and operated to rearrange the warp preventing supports positionally and numerically on the carrier means in accordance with a specific type of the printed circuit board to be soldered; control means for giving information to operate the robot means to rearrange the warp preventing supports positionally and numerically on the carrier means.

BRIEF DESCRIPTION OF THE DRAWINGS

FIGS. 1 through 7 relate to a first embodiment of the invention, in which;

FIGS. 1 is a whole automatic reflow soldering apparatus of the invention shown in vertical section;

FIG. 2 is a perspective view showing the essential parts of a printed circuit board entering station of the soldering apparatus;

FIG. 3 is a heating chamber of the soldering apparatus shown in vertical section;

FIG. 4 is a perspective view showing the essential parts of a printed circuit board take-out station of the soldering apparatus;

FIG. 5 is a side view showing partly in vertical section a printed circuit board and a carrier wherein the printed circuit board is positioned on a carrier by positioning guides;

FIG. 6 is a side view showing partly in vertical section the printed circuit board and the carrier wherein the printed circuit board is positioned on the carrier by the positioning guides and is supported by warp preventing supports;

FIG. 7 is a diagram showing the operations of the soldering apparatus;

FIG. 8 through 11 relate to a second embodiment of the invention, in which;

FIG. 8 is a perspective view of a carrier of the soldering apparatus;

FIG. 9 is a diagram showing the operations of the soldering apparatus;

FIG. 10 is a side view showing partly in vertical section a printed circuit board and a carrier wherein the printed circuit board is positioned on the carrier by positioning guides; and FIG. 11 is a side view showing partly in vertical section the printed circuit board and the carrier wherein the printed circuit board is positioned on the carrier by the positioning guides and supported by warp preventing supports.

DETAILED DESCRIPTION OF THE INVENTION

Figure 1:
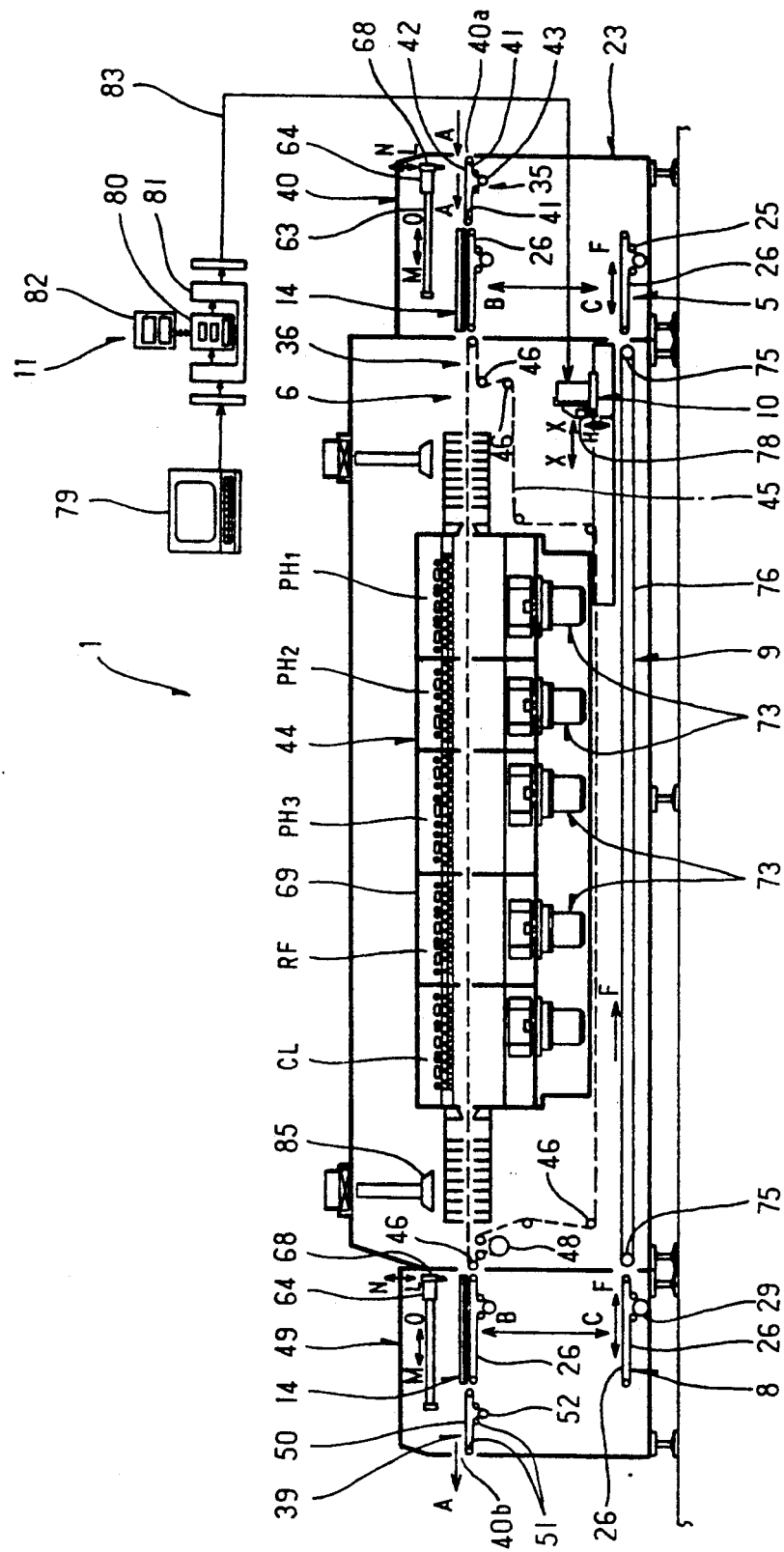

The invention will be described in reference to the embodiments as illustrated in the attached drawings. The first embodiment of the invention is shown in FIGS. 1 through 7, in which an automatic reflow soldering apparatus 1 is substantially composed of a carrier 2, positioning guides 3, warp preventing supports 4, a carrier elevating unit 5, a transporting unit 6, a carrier lowering unit 8, a carrier returning conveyer unit 9, a support mounting robot 10 which is automatically operated to mount the warp preventing supports 4, a control unit 11 and an information read-out unit though this is not shown.

The carrier 2 is to carry a printed circuit board 14 having a plurality of electronic elements 13 mounted thereon. The carrier is a rectangular frame 15 of stainless steel which is not easily oxidized. The frame 15 has a not 16 mounted therein by screws 18. The net 16 is made of meshed stainless steel wires, for example, of a material of martensite structure which is to be magnetically attracted. The sides 15a of the frame 15, which are located across the board transporting direction, are each formed into a crank to be mounted on the transporting unit 6 so that the frame 15 may be transported in the direction indicated by the arrow marks A.

The positioning guides 3 are to position the printed circuit board 14 onto a predetermined place of the carrier 2 when the board 14 is mounted on the carrier 2. The positioning guides 3 are actually a pair of pins each having, for example, a larger diameter portion 3a and a tapered portion 3b of a smaller diameter, and are fixedly positioned on both ends of a support block 20 secured to the frame 15 of carrier 2 by a screw 19.

Figure 5:
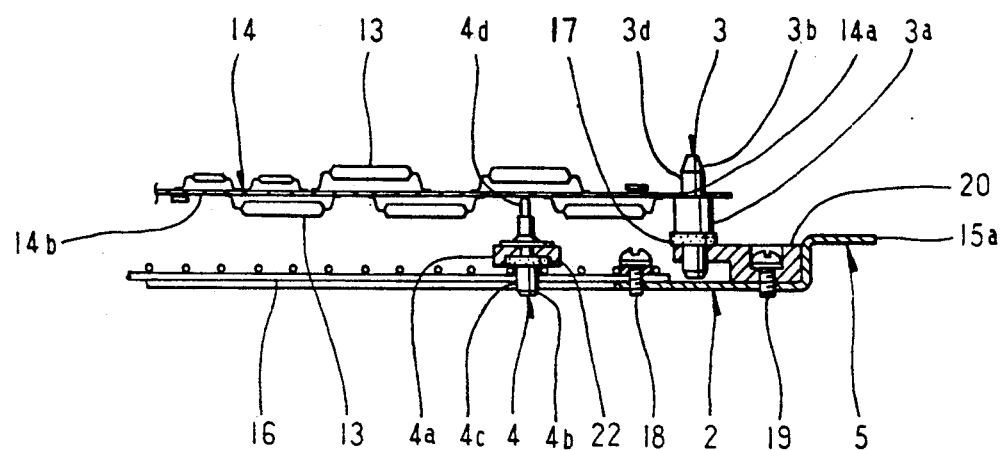
Figure 6:
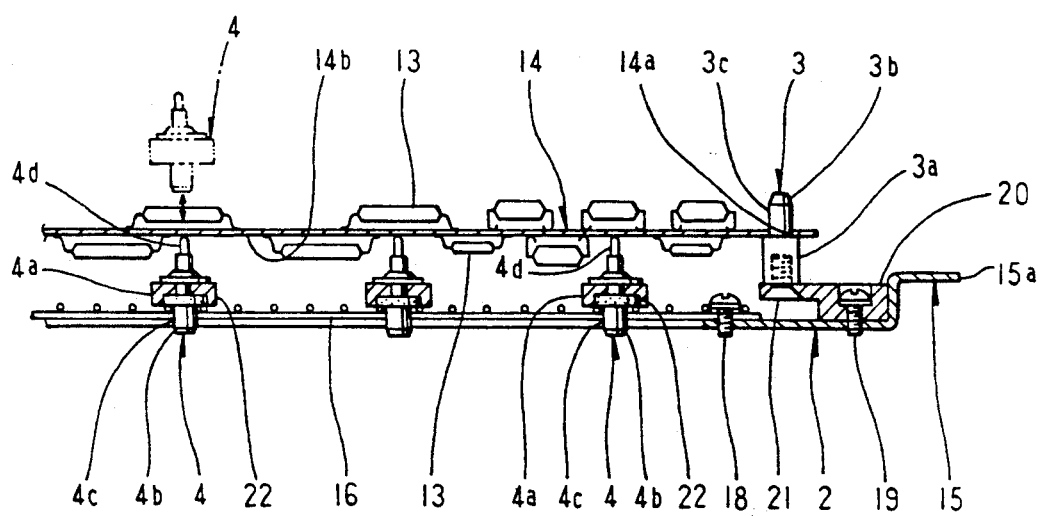
Figure 7:
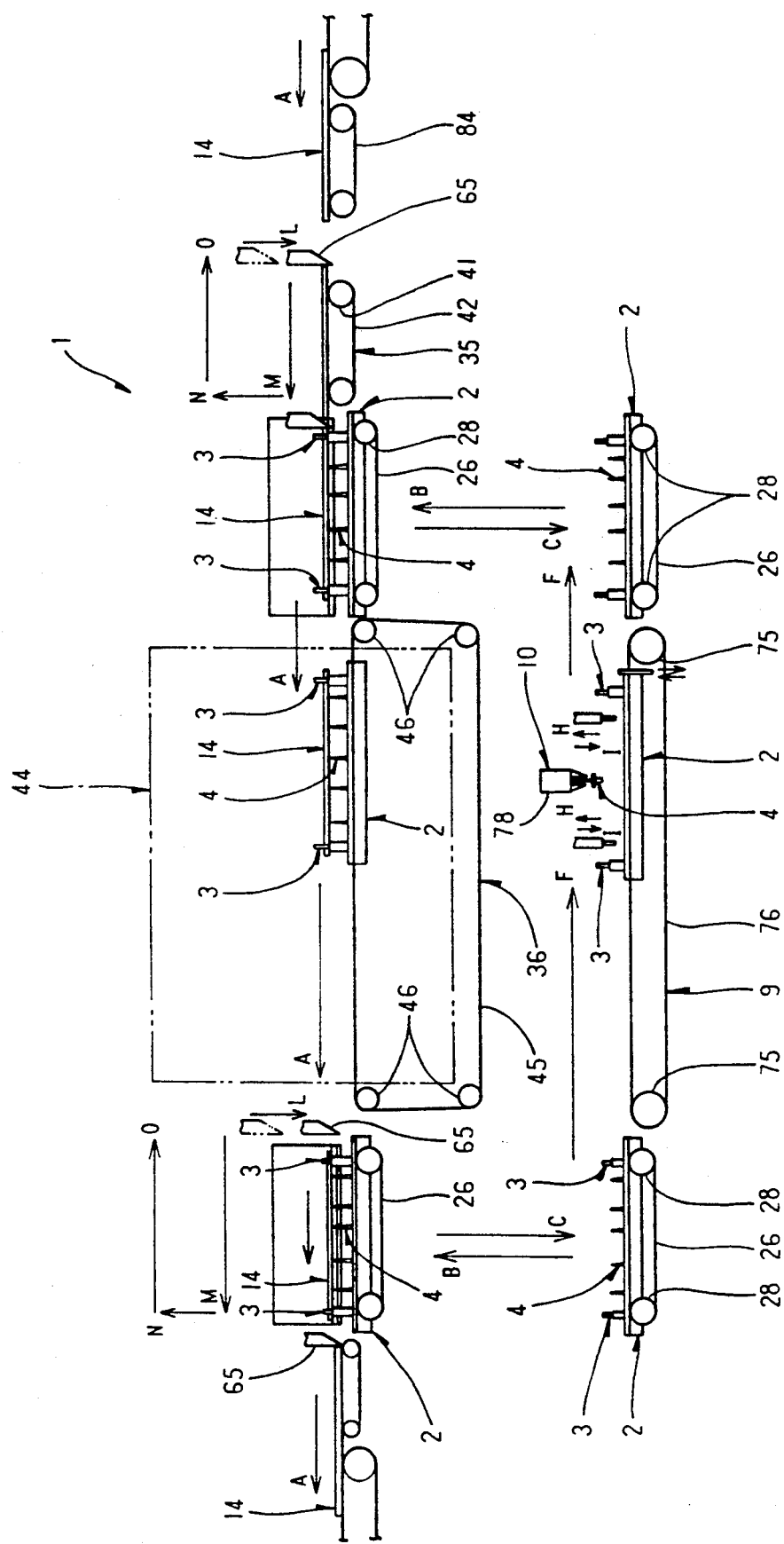
Figure 8:
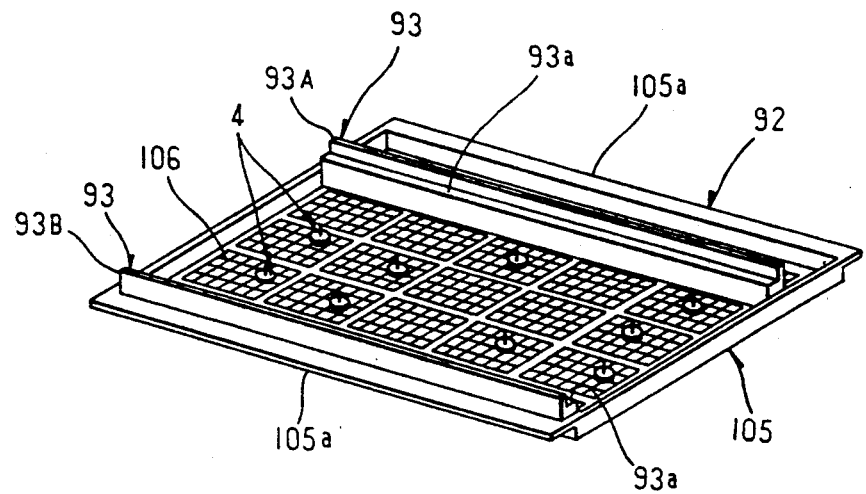

One of the two positioning guides 3 is fixedly mounted on the support block 20 by a plate-head screw 21 as shown in FIG. 6 and is therefore immovable. The other positioning guide is movable in accordance with the size of the printed circuit board 14 because the guide 3d is mounted on the support block 20 by means of a magnet 21a which is secured to a lower part of the larger diameter portion 3a of the guide 3c and magnetically attracts the guide to the support block 20 as shown in FIG. 5 The movable and immovable positioning guides 3c, 3d will position the printed circuit board 14 in such a manner that the tapered small diameter portions 3b of the guides are inserted into respective positioning openings 14a formed in the printed circuit board 14.

The warp preventing supports 4 are employed to support the underside of the printed circuit board 14 all through the soldering process of the print circuit board to thereby prevent the board 14 from being warped during the soldering process. The supports 4 are each composed of a body 4a and a pin shaped support 4b which vertically passes through the body 4 to provide lower and upper protruded supports 4c, 4d. The lower protruded support 4c has a dimension of diameter which is slightly smaller than the size of the mesh of the carrier net 16 so that the lower support 4c may be inserted into any of the meshes of the carrier net 16. The upper protruded support 4d is formed so slender that the support 4d may support the underside 14b of the printed circuit board 14 without contacting any of the electronic elements 13 and the wiring patterns (not shown) thereof which are arranged on the underside 14b of the print circuit board 14. The body 4a has a circular magnet 22 secured to the underside thereof. The warp preventing support 4 is, therefore, magnetically attracted to the nut 16 of the carrier 2 when the lower protruded support 4c is inserted into one of the meshes of the net 16.

The carrier elevating unit 5 is to receive and elevate the carrier 2 which is transported to the carrier returning conveyer 9 to the carrier elevating unit 5 located in a printed circuit board entrance station 23. The carrier elevating unit 5 has a base plate 24, which is substantially of the same dimensions with those of the carrier 2, slidably engaging a pair of vertical guide shafts 25 so that the base plate 24 may be vertically moved in the directions as shown by the arrow marks A and B in FIG. 2. The base plate 24 has a pair of belts 26 arranged thereon in parallel with each other and spaced from each other with a distance substantially corresponding to the width of the carrier 2. The pair of belts 26 are wound around a plurality of pulleys 28 rotatably mounted on the base plate 24, and further wound around pulleys 30 operatively connected to a drive motor 29 and rotationally driven thereby. The pair of belts 26 are driven in a same direction at a same speed by the drive motor 29 to transport the carrier 2 in the direction as shown an arrow mark A when the carrier 2 is placed on the belts 26. The base plate 24 has another belt 34 secured thereto. The belt 34 is wound around a lower pulley 32 secured to a drive motor 31 and is further wound around another upper pulley 33 rotatably provided above the motor 31. The belt 34 is therefore driven by the motor 31 to move the base plate 24 in the vertical directions as shown by the arrow marks B and C in FIG. 2.

The transporting unit 6 is to transport the carrier 2 having the printed circuit board 14 loaded thereon and is substantially composed of a printed circuit board receiving conveyer unit 35, the above mentioned pair of belts 26, a main conveyer unit 36, another pair of belts 26 of the carrier lowering unit 8 and a carrier take-out conveyer unit 39.

The printed circuit board receiving conveyer unit 35 transports the printed circuit board 14, which is brought on to an entrance 40a of a body cover 40 of the reflow soldering apparatus 1, to transfer the printed circuit board 14 to the carrier elevating unit 5. The printed circuit board receiving conveyer unit 35 is composed as well known of a pair of chain conveyers 42 wound around a plurality of guide rollers 41 and is driven by a drive motor 43 to transport the printed circuit board 14 in the direction as shown by the arrow marks A in FIGS. 1 and 2 so as to transfer the printed circuit board 14 to the carrier 2 placed on the pair of belts 26 of the carrier elevating unit 5.

The main conveyer unit 36 is to receive the printing circuit board loaded carrier 2 transported by the belts 26 of the carrier elevating unit 5 in the printed circuit board receiving station 23 and is to transport the printed circuit board loaded carrier 2 through a soldering chamber unit 44 composed of a preliminary heating chambers PH1, PH2, PH3, a reflow soldering chamber RF and a cooling chamber CL for gradually cooling down the soldered printed circuit board 14. The main conveyer unit 36 is composed as well known of a pair of chain conveyers 45 wound around a plurality of guide rollers 46 and a pulley (not shown) secured to a drive motor 48. The drive motor 48 is energized to run the pair of chain conveyers 45 to thereby transport the carrier 2 having a printed circuit board 14 loaded thereon in the direction A as shown by the arrow mark in FIG. 2 and into the soldering chamber unit 44 and further to transport the soldered printed circuit board 14 out of the soldering chamber unit 44 and then to transfer the soldered printed circuit board 14 together with the carrier 2 to the pair of belts 26 of the carrier lowering unit 8 located in a printed circuit board delivery station 49.

The carrier delivery conveyer unit 39 receives the soldered printed circuit board 14 separated from the carrier 2 in the printed circuit board delivery station 49 and takes the soldered printed circuit board 14 out of the body cover 40 of the reflow soldering apparatus 1 at an exit 40b thereof. The carrier delivery conveyer unit 39 is composed as well known of a pair of chain conveyers 50 which are substantially same with the conveyers 35 of the printed circuit board receiving conveyer unit 35 and are wound around a plurality of guide rollers 51 and driven by a drive motor 52 to transport the soldered printed circuit board 14 in the direction as shown by the arrow mark A in FIGS. 1 and 4.

Figure 2:
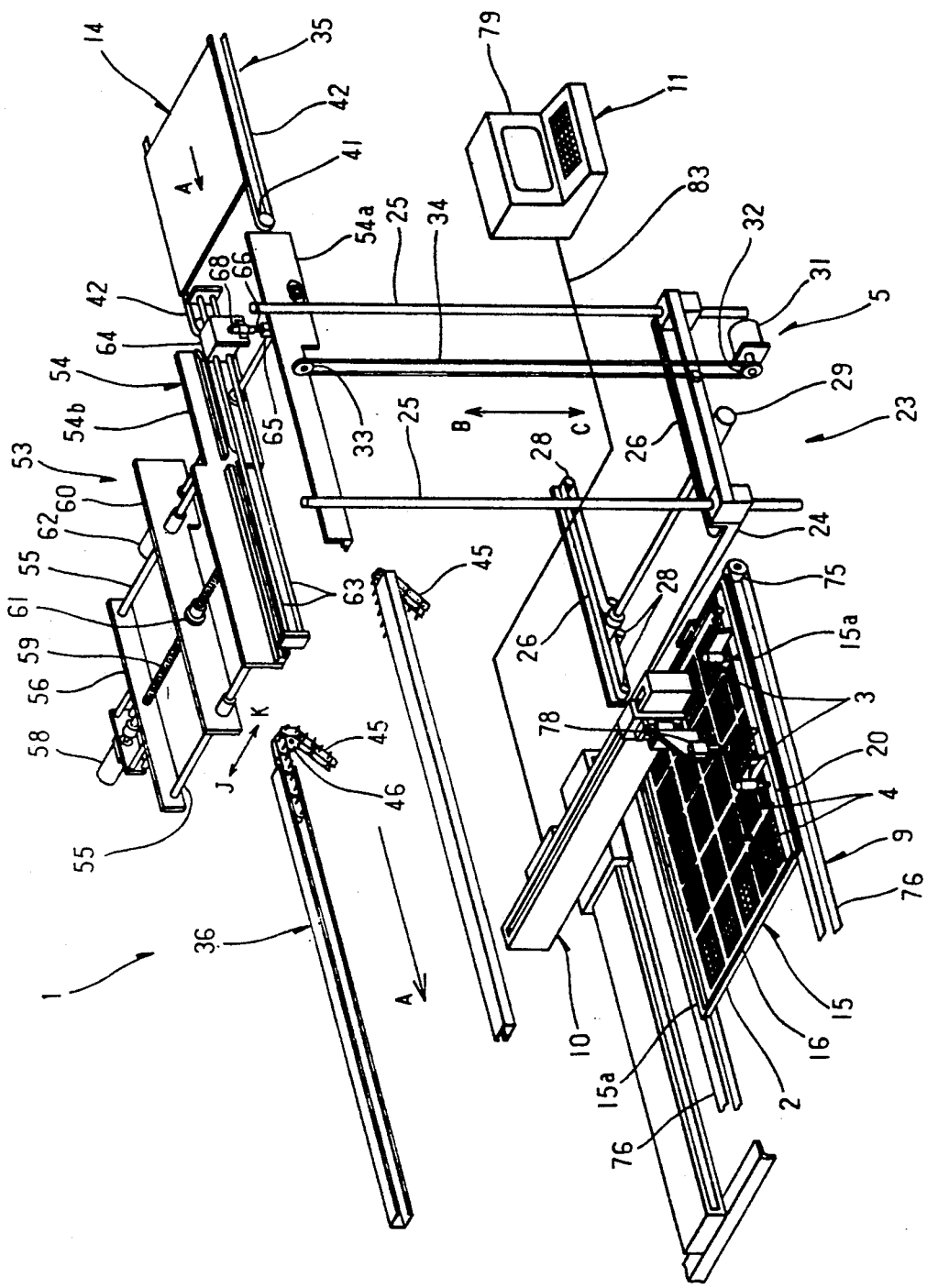
Figure 4:
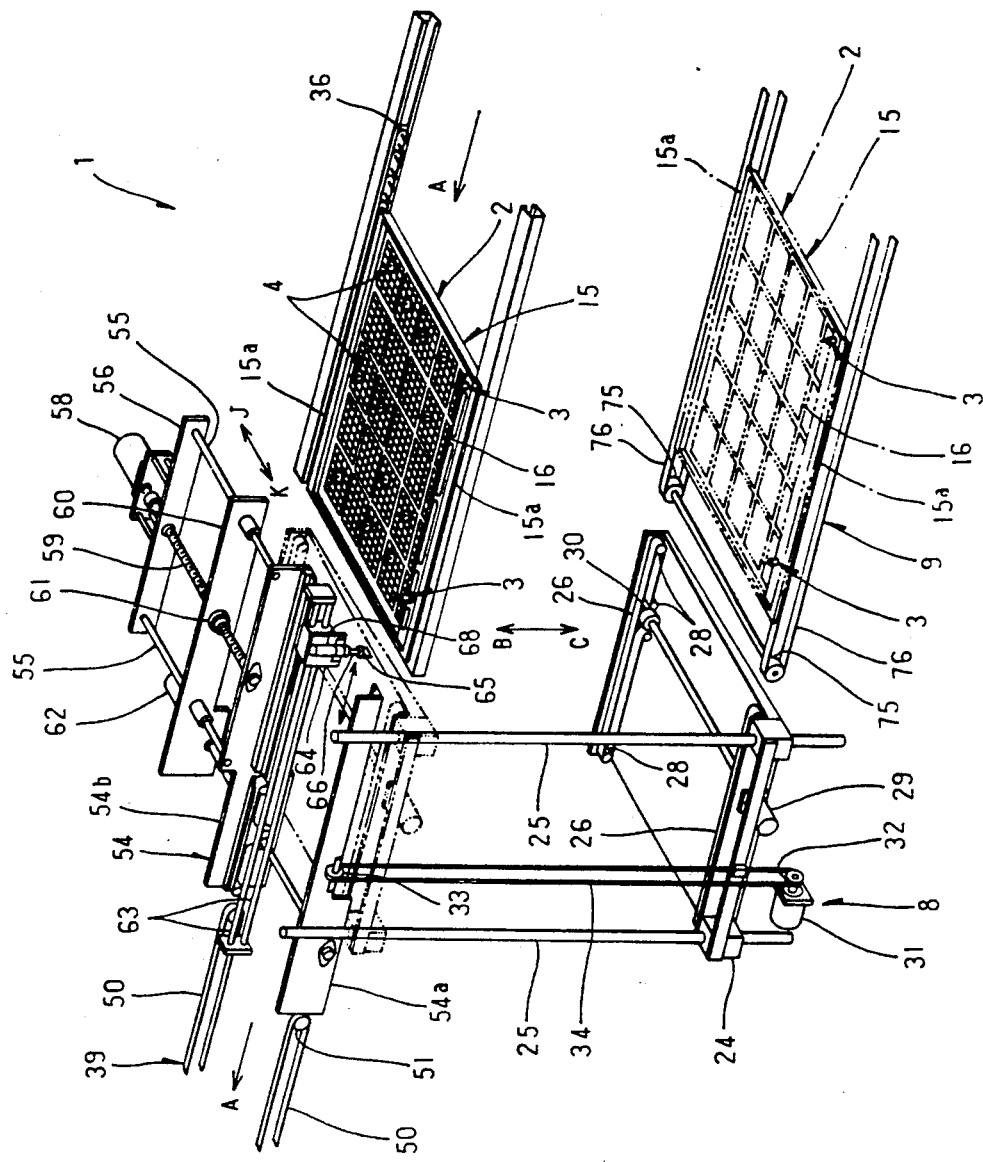

As particularly shown in FIGS. 2 and 4, a printed circuit board mounting structure 53 is provided between the printed circuit board receiving conveyer unit 35 and the main conveyer unit 36. The printed circuit board mounting structure 53 is substantially composed of a pair of guide plates 54 which are L - shaped in vertical section. More particularly one 54a of the guide plates 54 is secured to a base extending from one of the chain conveyers 42, and the other guide plate 54b is movable and is fixedly connected to a motor mounting plate 56 by a pair of rods 55. A motor 58 mounted on the motor mounting plate 56 has a lead screw 59 secured to a rotation shaft thereof. The lead screw 59 is in mesh with a female screw 61 secured to a support 60 which is to be fixedly positioned on a base (not shown), so that the rotation of the motor 58 will result in rotation of the lead screw 59. Accordingly the guide plate 54b will be moved together with the motor mounting plate 56 and the motor 58 mounted thereon in the directions shown by the arrow mark J or K across the printed circuit board transporting direction. Thus the distance between the two guide plates 54a, 54b ia adjusted in accordance with the width of the printed circuit board 14 which is transported to the printed circuit board mounting structure 53 by the printed circuit board receiving conveyer unit 35 so as to be held by the two guide plates 54a, 54b which are L - shaped in vertical section.

Between the two guide plates 54a, 54b there is provided a feed block 64 which is driven by a motor 62 secured to the support 60 and slidingly move along a pair of guide shafts 63. The feed block 64 has a fluid pressure cylinder 68 secured thereto in a downwardly directed condition. The cylinder 68 has a cylinder rod 66 having an engaging piece 65 secured to the lower end thereof, and is operated to expand to move down the engaging piece 65 at the back side of the printed circuit board 14 when the board 14 is transported by the conveyer unit 35 to a predetermined position. The motor 62 is then rotated to move the cylinder 68 in the direction as shown by the arrow mark A so that the engaging piece 65 may push the printed circuit board 14 in the same direction to thereby feed the printed circuit board 14 to a predetermined place on the pair of guide plates 54a, 54b.

Figure 3:
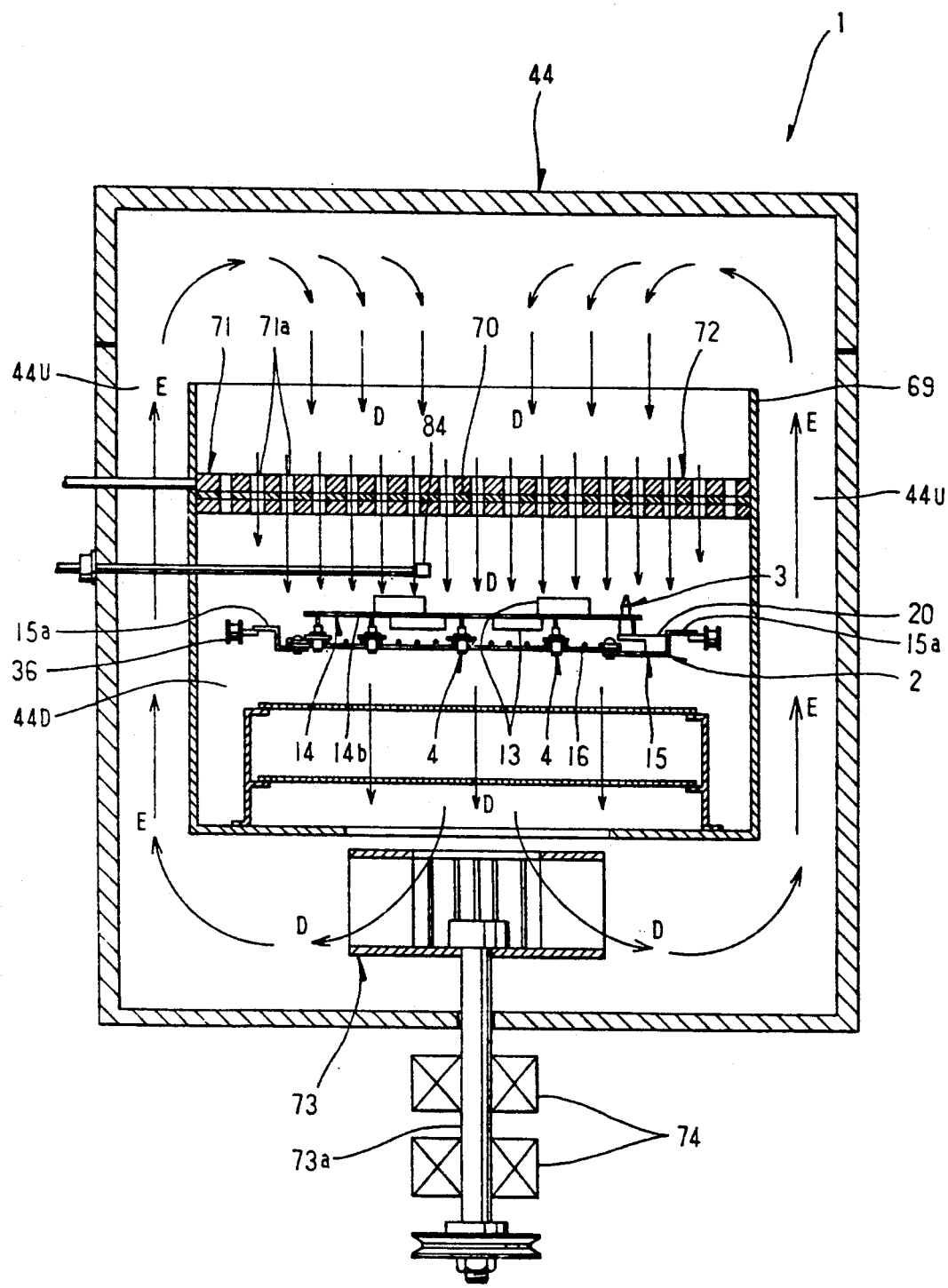

In reference to FIGS. 1 and 3 the heating chamber unit 44 is divided into the preliminary heating chambers PH1, PH2, PH3, reflow soldering chamber RF and cooling chamber CL which are substantially of the same structure though the temperature of the respective chambers is different. These chambers are filled with an inert gas such as a nitrogen gas. Each of the chambers has a casing 69 provided therein in such a manner that a gas circulating channel 44u is formed between the casing 69 and the wall of the heating chamber 44 in order to circulate the inert gas up therethrough. The casing 69 has another gas circulating channel 44D for circulating the inert gas down therethrough.

A heater unit 72 is provided at an upper part in the casing 69 to heat the inert gas. The heater unit 72 is composed of a heater 70 and metal plates 71 which are perforated with many holes 71a and sandwich the heater 70. The main conveyer unit 35 is to run below the heater unit 72 in the direction as shown by the arrow mark A.

Each of the chambers of the heating chamber unit 44 has a ventilator 73 such as a sirroco fan provided at a lower part thereof. The ventilator 73 has a shaft 73a supported by ball bearings 74, and is driven by a motor (not shown) for rotating the shaft 73a to thereby let the inert gas flow down through the gas circulating channel 44D in the direction as shown by the arrow marks D so that the printed circuit board 14 transported by the main conveyer unit 35 may be heated, and then to let the inert gas flow up through the gas circulating channel 44U in the direction as shown by arrow marks E.

As shown in FIGS. 1 and 4, the carrier lowering unit 8 is provided in the printed circuit delivery station 49 to lower the carrier 2 to separate the same from the printed circuit board 14. As the carrier lowering unit 8 is of the same structure with the carrier elevating unit 5 in the carrier receiving station 23, the components are indicated with the same reference numerals with those of the carrier elevating unit 5 and therefore the explanation thereof is omitted.

The carrier returning conveyer unit 9 is to return the carrier 2 to the carrier receiving station 23 from the carrier delivery station 49, and is substantially composed of a pair of chain conveyers 76 which are, as generally known, wound around guide rollers 75 respectively which are provided in the carrier delivery station 49 and the carrier receiving station 23. The carrier returning conveyer unit 9 receives the carrier 2 from the pair of belts 26 of the carrier lowering unit 8 and transports the same in the direction F as shown by an arrow mark in FIG. 1 to transfer the carrier 2 over to the pair of belts 26 of the carrier elevating unit 5.

The support mounting robot 10 is automatically operated to rearrange the positions as well as the numbers of the warp preventing supports 4 on the carrier 2 in accordance with the circuit patterns of the printed circuit board 14 which is loaded on the carrier 2 returned by the carrier returning conveyer unit 9. As shown in FIG. 2, the support mounting robot 10 is arranged above the carrier returning conveyer unit 9 and is moved in the directions determined by the compound drives in the X and Y axes. The robot 10 has a manipulator 8 mounted on one end thereof for holding the warp preventing supports 4 and for transferring the same in the vertical directions as shown by the arrow marks H and I to remove unnecessary supports 4 from the returned carrier 2 and position the supports 4 onto required places of the carrier 2 where the supports 4 are attracted and secured to the meshed net 16 of the carrier 2 by the magnets 22 mounted on the supports 4 respectively.

The control unit 11 is to operate in timed relations the printed circuit board receiving conveyer unit 35, the carrier elevating unit 5, the main conveyer unit 36, the carrier lowering unit 8, the printed circuit board delivery conveyer unit 39, the carrier returning conveyer unit 9 and the support mounting robot 10. As shown in FIG. 1, the control unit 11 is a computer substantially composed of a console 79, a central process or unit 80, an input and output port 81 and an outside memory 82. The control unit 11 receives signals detected by sensors (not shown) arranged in the required parts of the apparatus 1 and processes the signals in a predetermined sequence to control the respective units of the apparatus 1 through a signal transmission line 83.

The information read-out unit (not shown) is to confirm discrimination codes such as bar codes attached to the respective printed circuit board 14 to be transported, and is to transmit the signals to the control unit 11. The information read-out unit may be a bar code reader. The control unit is operated in response to the descrimination codes to read out the respective patterns stored in the outside memory 82 for controlling the robot 10 to arrange the warp preventing supports 4 on the carriers 2 in accordance with the respective patterns so that the supports 4 may support the printed circuit boards 4 each having specific circuit patterns.

The present invention has a structure as mentioned above, and the operation is as follows: In reference to FIGS. 1, 2 and 7, the printed circuit board 14 having the electronic elements 13 (FIG. 3) mounted thereon is transported by a conveyer 84 or manually in the direction as shown by an arrow mark A into the printed circuit board entrance 40a. Then the discrimination code of the printed circuit board 14 is read out by the read-out unit (not shown) and is transmitted to the control unit 11. The control unit 11 is operated in response to the code signal to discriminate the type of the printed circuit board 14 and determine the width of the board.

Simultaneously the control unit 11 rotates the motor 58 of the printed circuit board mounting structure 53 to rotate the lead screw 59 to thereby move the guide plate 54b in the directions as shown by the arrow mark J or K so as to adjust the distance between the fixed guide plate 54a and the movable guide plate 54b in accordance with the width of the printed circuit board 14. When the printed circuit board 14 is transported by the printed circuit board receiving unit 35 in the direction as shown by the arrow mark A and comes to a predetermined position, the fluid pressure cylinder 68 is expanded in the direction as shown by an arrow mark L to lower the engaging piece 65 behind the printed circuit board 14. At the same time, a positioning stopper (not shown) provided forwardly of the printed circuit board mounting structure 53 is protruded into the printed circuit board transportation path.

The motor 62 is then rotated to move the feed block 64 in the direction as shown by an arrow mark M to thereby push the printed circuit board 14 in the direction as shown by the arrow mark A until the front end of the printed circuit board 14 comes to contact the stopper. Thus the printed circuit board 14 is positioned on the pair of guide plates 54a, 54b which are L - shaped in vertical section.

The motor 31 is then rotated to drive the belt 34 to thereby elevate the carrier elevating unit 5 in the direction as shown by the arrow mark B while the carrier 2 is placed on the carrier elevating unit 5. The carrier 2 is elevated until the pair of positioning guides 3 are inserted into the positioning openings 14a of the printed circuit board 14 respectively and until the warp preventing supports 4 arranged on the carrier 2 come to contact the underside 14b of the printed circuit board 14 as particularly shown in FIGS. 5 and 6. Thus the printed circuit board 14 is mounted on the carrier 2.

The positioning stopper (not shown) is then moved back from the printed circuit transporting path and simultaneously the fluid pressure cylinder 68 is operated to move back the engaging piece 65 in the direction as shown by an arrow mark N, and then the motor 62 is rotated to move back the printed circuit board feed block 64 in the direction as shown by an arrow mark O.

The motor 29 is then rotated to drive the pair of belts 26 which are respectively in engagement with the cranks formed on both sides 15a of the frame 15 and transport the carrier 2 having the printed circuit board mounted thereon in the direction as shown by the arrow mark A to transfer over to the carrier 2 over to the main conveyer unit 36.

Further in reference to FIG. 4, the print circuit board 14 mounted on the carrier 2 is transported by the main conveyer unit 36 into the heating chamber unit 44 and into the preliminary heating chambers PH1, PH2, PH3 one after another while the heater unit 72 is energized to heat the inert gas such as the nitrogen gas which is circulated by the ventilator 73 in each of the heating chambers through the gas flow-down circulating channel 44D and the gas flow-up circulating channel 44U at a circulation speed of about 3 m/sec. for the purpose of heating the printed circuit board with a constant temperature.

When the ventilator 73 is driven, the gas flow-down circulating channel 44D is given a negative pressure, and therefore the nitrogen gas existing in the upper part of each heating chamber will flow down through the perforations 71a of metal plates 71 in the direction as shown by the arrow marks D where the nitrogen gas effects a heat exchange with the metal plates 71 heated by the heater 70. The nitrogen gas thus heated flows further down and contacts the printed circuit board 14 and the electronic elements 13 mounted thereon as the board is transported by the main conveyer unit 36 and heats the same. The nitrogen gas is further sucked by the ventilator 73 and flows in two opposite sides in the lower part of the chamber as shown in FIG. 3 and flows up in the directions as shown by arrow marks E through the gas flow-up circulating channel 44U and returns to the upper part above the heater 70. The temperature of the nitrogen gas is detected by a sensor 84 and the value is fed back to the control unit 11 which is designed to supply a required power to the heater 70 to maintain the nitrogen gas at a predetermined temperature.

The temperatures of the preliminary heating chambers PH1, PH2, PH3 are independently set to predetermined values, and therefore the printed circuit board 14 may be gradually or progressively heated up without adverse influences of heat-shock to the printed circuit board 14 and the electronic elements 13 mounted thereon. The preliminary heating processes are finished while the printed circuit board 14 is finally heated up to about 150° C.

The printed circuit board 14 heated in the preliminary heating chambers is then transported into the reflow soldering chamber RF where the printed circuit board 14 is contacted by the nitrogen gas heated up to about 230° C. which is sufficient to melt a cream solder to fix the electronic elements 13 to the printed circuit board 14.

The preliminary heating chambers PH1, PH2, PH3 and the reflow soldering chamber RF are filled with the inert nitrogen gas and the oxygen density of the heating chamber unit 44 is 100ppm-1000ppm, and therefore the molten solder and the leads of the electronic elements 13 will not be oxidized and a completely desired soldering effect is attained.

The heated and soldered printed circuit board 14 is then transported into the cooling chamber CL which is designed to slowly cool down the printed circuit board 14. The cooled printed circuit board 14 is transported out of the cooling chamber CL and is further cooled down by a cooled nitrogen gas jetted from a cooler 85 while the printed circuit board 14 is transported thereunder. The finally cooled printed circuit board 14 is further transported by the main conveyer unit 36 and is transferred over to the carrier lowering unit 8.

As mentioned above, the printed circuit board 14 is supported by a plurality of warp preventing supports 4 engaging the underside 14b of the board 14 all through the processes from the preliminary heating steps to the final cooling step. The printed circuit board 14 is prevented from being warped.

Further in reference to FIG. 4, when the printed circuit board 14 is transported to a predetermined position by the pair of belts 26 of the carrier lowering unit 8, the motor 29 is deenergized and stopped. At this time, the opposite sides of the printed circuit board 14 are positioned above the pair of guide plates 54a, 54b with a vertical slight clearance provided therebetween and the carrier 2 are placed on the pair of belts 26 in such a manner that the cranks 15a formed on the opposite sides of the frame 15 are positioned on the pair of belts 26.

The motor 31 is then energized and is rotated to lower the carrier lowering unit 8 in the direction as shown the arrow mark C leaving the printed circuit board 14 on the pair of guide plates 54a, 54b which are L - shaped in vertical section while the pair of positioning guides 3 of the carrier 2 one disengaged from the respective positioning openings 14a of the printed circuit board 14 and the carrier 2 is transported down by the carrier lowering unit 8. Then the fluid pressure cylinder 68 located behind the printed circuit board 14 is expanded to lower the engaging piece 65 in the direction as shown by the arrow mark L. The motor 62 is driven to transport the printed circuit board feed block 64 in the direction as shown by the arrow mark M to thereby cause the engaging piece 65 to push the printed circuit board 14 onto the printed circuit board delivery conveyer unit 39 which is moved to transport the printed circuit board 14 out of the exit 40b of the apparatus 1.

The lowered carrier 2 is then transported to the direction as shown by an arrow mark F and is transferred to the carrier returning conveyer unit 9 by the pair of belts 26 of the carrier lowering unit 8 which are reversely driven by the motor 29. The carrier returning conveyer unit 9 transports the carrier further in the direction as shown by the arrow mark F and transfers the carrier into the printed circuit board receiving station 23.

While the carrier returning unit 9 is on the way of returning the carrier 2 to the printed circuit board receiving station 23, the information read-out unit confirms a discrimination code of the printed circuit board 14 which is to be mounted on the carrier 2 and reads out a specific pattern corresponding to the circuit of the printed circuit board 14 from the outside memory 82 of the control unit 11 to thereby control the robot 10. The robot 10 is operated to move the manipulator 78 in the directions determined by the compound drives in the X and Y axes to rearrange the warp preventing supports 4 positionally and numerically on the carrier 2 in accordance with the read out pattern wherein the warp preventing supports 4 are inserted in the meshes of the net 16 and fixedly positioned thereon due to the function of the magnets 22 for supporting the printed circuit board 14 to be placed on the carrier 2.

The carrier 2 thus prepared is transferred over to the carrier elevating unit 5 which is located at the lower position, and thus the preparation is finished to load a new printed circuit board 14 on the carrier 2. The warp preventing supports 4 are thus automatically rearranged positionally and numerically on the carrier 2 while the carrier 2 is circulated in the predetermined course and support the printed circuit board 14 at the underside 14b thereof to prevent the printed circuit board 14 from being warped when the latter is soldered.

Now in reference to FIGS. 8 through 11, a second embodiment of the invention will be described: According to the embodiment, positioning guides 93 are actually a pair of rails 93A, 93B each providing a step 93a for carrying the printed circuit board 14 thereon and are spaced from each other in the direction of the width of a carrier 92 in contrast to the positioning guide unit 3 of the first embodiment. The positioning guides 93 are, as shown in FIG. 10, each secured by means of a pin 100 to a support block 110 which is fixedly connected by a screw 109 to a frame 105. The frame 105 has opposite sides each 105a formed in a flange in the same manner just as the first embodiment so that the frame 105 may be carried on the chain conveyer 45 so as to be transported thereby. A net 106 and the warp preventing supports 4 are the same with those of the first embodiment and therefore the explanation thereof is omitted.

Figure 9:
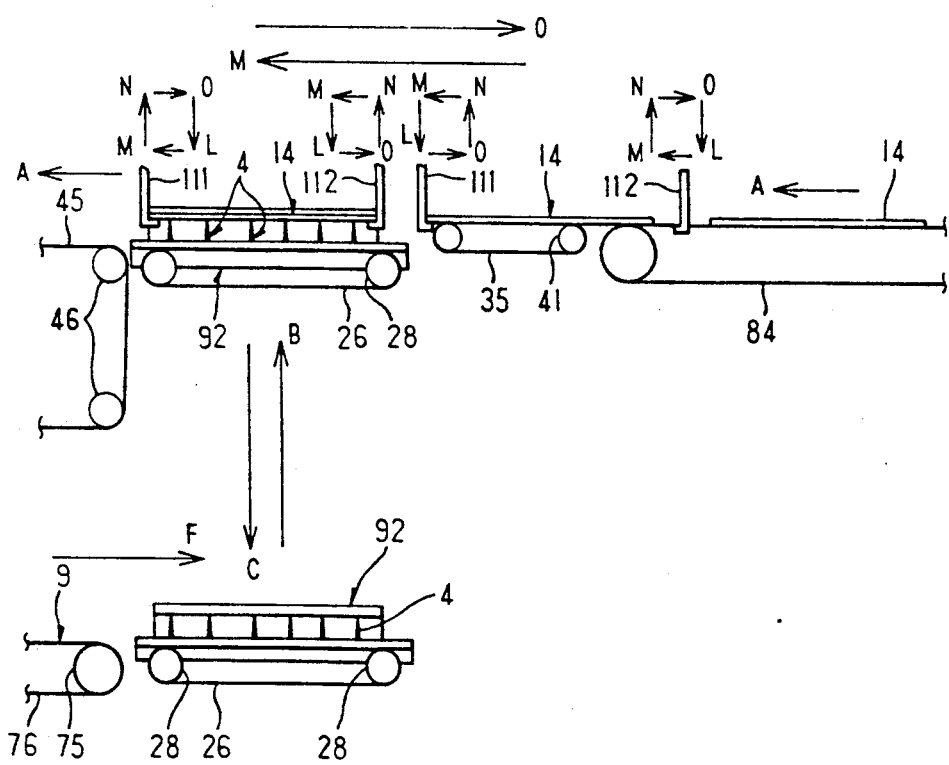
Figure 10:
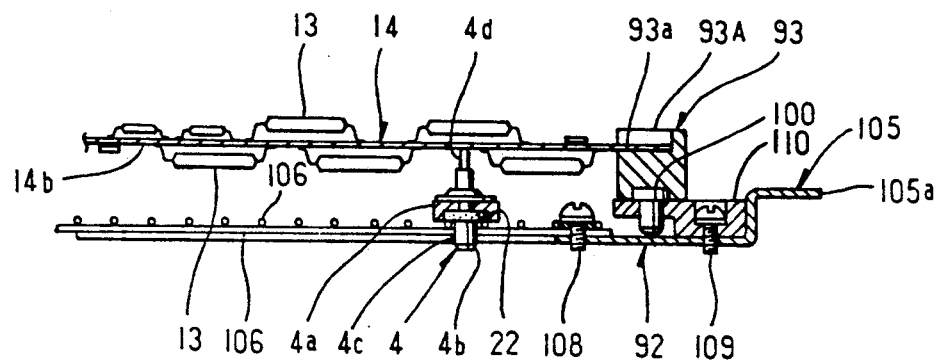
Figure 11:
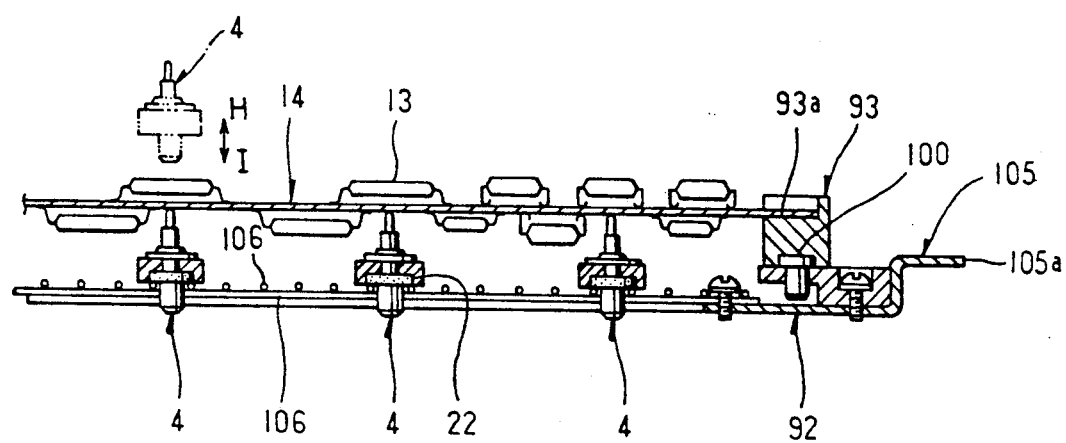

In reference to FIG. 9, the printed circuit board 14 is mounted onto the carrier 92 by a pair of first and second movable hooks 111, 112, one of which is arranged on the front side of the printed circuit board 14 and the other of which is arranged on the back side of the printed circuit board 14 in the transporting direction and each operated by a drive source (not shown). The first and second hooks 111, 112 are moved in the directions as shown by arrow marks L, M, N, 0 to support and lift the printed circuit board 14 which is transported thereto by a conveyer 84 and transfer the printed circuit board 14 onto the pair of positioning guides 93 of the carrier 92 which is awaiting on the belts 26. In this embodiment, the parts identical with those of the first embodiment are indicated by the same reference numerals and the explanation is omitted.

According to the second embodiment, the printed circuit board 14 need not have the positioning openings 14a.

Although not illustrated, the pair of hooks 111, 112 may be used in the first embodiment to lift the printed circuit board 14 and set the same down to the awaiting carrier 2 in such a manner that the positioning openings 14a engages the positioning guides 3 respectively of the carrier 2.

ADVANTAGES AND EFFECTS OF THE INVENTION

Since the invention is so structured and so operated as to support the underside of the printed circuit board by a plurality of warp preventing supports provided on the carrier which is transported all through the soldering processes, the printed circuit boards, which have various different properties, will be prevented from being warped and the electronic elements, which have various different properties, will be soldered to the board with stabilized and high-quality soldering effects eliminating an excessive stress which may be applied to the leads of the electronic elements. Further the electronic elements may be additionally mounted and soldered onto the printed circuit board in the next process and also may be assembled into machinery without any inconveniences.

Further since the printed circuit board is positioned on the carrier by a plurality of positioning guides which are inserted into the positioning openings respectively of the printed circuit board and the warp preventing supports are replaceably mounted on the carrier by the attracting force of magnets, the printed circuit boards of any sizes and/or types may be correctly positioned on the carrier and the warp preventing supports may be optionally rearranged onto desired positions of the carrier wherein the warp preventing supports will not interfere with the electronic elements mounted on the printed circuit board.

Further since the printed circuit board carrier is automatically transported to the printed circuit board receiving station by the returning conveyer to repeatedly carry the next printed circuit board after the preceding printed circuit board has been soldered, an efficient soldering operation may be attained.

Further due to provision of the robot for automatically rearranging the warp preventing supports, that is, to change the position as well as the number of the warp preventing supports on the carrier while the latter is transported, the warp preventing supports may be automatically rearranged positionally as well as numerically on the carrier in accordance with the various and different circuit patterns without inviting errors which may otherwise be committed and thus the efficiency of soldering operation is remarkably increased without a manual labor being required.

Further due to provision of the information read-out unit which is responsive to the different marks of the printed circuit boards to discriminate the specific circuit patterns of the printed circuit boards to be entered, the robot is automatically operated in response to the instructions from the information read-out unit to rearrange the warp preventing supports on the carrier to meet any types of circuit patterns prepared on the printed circuit boards. Thus a completely automatic and operationally excellent reflow soldering apparatus is provided.

The invention being described as mentioned above, it will be obvious that the same may be varied and modified in various ways. The variation and/or modifications of the invention will not be regarded as a departure from the spirit and scope of the invention, and all the such modifications will be intended to be included within the scope of the invention as claimed herein.

What is claimed is:

1. An automatic reflow soldering apparatus for soldering a printed circuit board having a plurality of electronic elements mounted thereon to be soldered while the printed circuit board is heated, the apparatus comprising: means for transporting the printed circuit board; carrier means for carrying the printed circuit board thereon and being transportable by the transporting means; positioning means including a plurality of guide pins arranged on the carrier means and being insertable into the printed circuit board on the carrier means for positioning the printed circuit board on the carrier means, at least one of the pins being capable of rearrangement on the carrier means in accordance with the size of the printed circuit board; warp preventing support means including a plurality of supports arranged on the carrier means to support the printed circuit board at the underside thereof in cooperation with the positioning guide pins to prevent the printed circuit board from being warped during the soldering processes of the printed circuit board, the supports being capable of rearrangement on the carrier means in accordance with the size and type of the printed circuit board; wherein the printed circuit board is transported through all of the soldering processes from a heating process to a cooling process while the printed circuit board is positioned on the carrier means by the positioning guide means and is supported by warp preventing support means.

2. An automatic reflow soldering apparatus for soldering a printed circuit board having a plurality of electronic elements mounted thereon to be soldered while the printed circuit board is heated, the apparatus comprising: carrier means for carrying the printed circuit board thereon, said carrier means including a plurality of guide pins insertable into the printed circuit board for positioning the printed circuit board on the carrier means, at least one of the pins being capable of rearrangement on the carrier means in accordance with the size of the printed circuit board, and a plurality of warp preventing supports for supporting the positioned printed circuit board in cooperation with the positioning guide pins to prevent the printed circuit board from being warped during soldering processes, the supports being capable of rearrangement on the carrier means in accordance with the size and type of the printed circuit board; a station for receiving the printed circuit board to be soldered; elevating means located int he printed circuit board receiving station for elevating the carrier means to enable the latter to carry the printed circuit board received in the printed circuit board receiving station in such a manner that the positioning guides position the printed circuit board on the carrier means and the warp preventing supports support the printed circuit board; heating means for heating the printed circuit board to be soldered; means for transporting the carrier means carrying the printed circuit board through the heating means for soldering the printed circuit board; a second station for delivering the soldered printed circuit board; lowering means located in the second station for lowering the carrier means to separate the carrier means from the soldered printed circuit board so that only the soldered printed circuit board is delivered from the second station; conveyer means for returning the lowered carrier means to the printed circuit board receiving station; wherein the printed circuit board introduced into the printed circuit receiving station is soldered while the same is placed on the circulating transported carrier means, one after another, in such a condition that the printed circuit board is positioned on the carrier means by the positioning guides and is supported by the warp preventing supports.

3. An automatic reflow soldering apparatus for soldering a printed circuit board having a plurality of electronic elements mounted thereon to be soldered while the printed circuit board is heated, the apparatus comprising: carrier means for carrying the printed circuit board thereon, said carrier means including a plurality of guide pins insertable into the printed circuit board for positioning the printed circuit board on the carrier means, at least one of the pins being capable of rearrangement on the carrier means in accordance with the size of the printed circuit board, and a plurality of warp preventing supports for supporting the positioned printed circuit board in cooperation with the positioning guide pins to prevent the printed circuit board from being warped during soldering processes, the supports being capable of rearrangement on the carrier means in accordance with the size and type of the printed circuit board; a station for receiving the printed circuit board to be soldered; elevating means located in the printed circuit board receiving station for elevating the carrier means to enable the latter to carry the printed circuit board introduced into the printed circuit board receiving station in such a manner that the positioning guides position the printed circuit board on the carrier means and the warp preventing supports support the printed circuit board; heating means for heating the printed circuit board to be soldered; means for transporting the carrier means carrying the printed circuit board through the heating means for soldering the printed circuit board; a second station for delivering the soldered printed circuit board; lowering means located in the second station for lowering the carrier means to separate the carrier means from the soldered printed circuit board so that only the soldered printed circuit board is delivered from the second station; conveyer means for returning the lowered carrier means to the printed circuit board receiving station; robot means located on the carrier returning conveyer means and operated to rearrange the warp preventing supports positionally and numerically on the carrier means in accordance with a specific type of the printed circuit board to be soldered; control means for providing information to operate the robot means to rearrange the warp preventing supports positionally and numerically on the carrier means.

4. The automatic reflow soldering apparatus as defined in claim 3, further comprising information read-out means mounted on the conveyer means, the information read-out means being operated to discriminate the specific type of the printed circuit board to be soldered and to provide corresponding information to the control means for controlling the operation of the robot means.

* * * * *

UNITED STATES PATENT AND TRADEMARK OFFICE
CERTIFICATE OF CORRECTION

PATENT NO. : 5,242,096

DATED : September 7, 1993

INVENTOR(S) : Masashi TSUNABUCHI et al.

It is certified that error appears in the above-identified patent and that said Letters Patent is hereby corrected as shown below:

Claim 2, column 14, line 47, "int he" should read --in the--; and

Claim 2, column 14, line 58, "aelivering" should read --delivering--.

Signed and Sealed this

Twenty-ninth Day of March, 1994

*Attest:*

BRUCE LEHMAN

*Attesting Officer*    *Commissioner of Patents and Trademarks*